US008382172B2

(12) United States Patent
Bardes

(10) Patent No.: US 8,382,172 B2

(45) Date of Patent: Feb. 26, 2013

(54) DECOMPOSABLE COLLECTOR AND CONTAINER

(76) Inventor: Dale L. Bardes, Burlington, KY (US)

( * ) Notice: Subject to any disclaimer, the term of this patent is extended or adjusted under 35 U.S.C. 154(b) by 0 days.

(21) Appl. No.: 12/880,223

(22) Filed: Sep. 13, 2010

(65) Prior Publication Data

US 2011/0068038 A1 Mar. 24, 2011

Related U.S. Application Data

(60) Provisional application No. 61/244,575, filed on Sep. 22, 2009.

(51) Int. Cl.
*A01K 29/00* (2006.01)

(52) U.S. Cl. .......................................... 294/1.3; 294/25

(58) Field of Classification Search .................. 294/1.3, 294/25, 1.4, 1.5
See application file for complete search history.

(56) References Cited

U.S. PATENT DOCUMENTS

| | | | | |
|---|---|---|---|---|
| 1,713,065 | A | 5/1929 | Williams | |
| 2,736,052 | A | 2/1956 | Tufarolo | |
| 3,608,708 | A | 9/1971 | Storandt | |
| 3,739,418 | A | 6/1973 | Yonaites et al. | |
| 3,978,540 | A | 9/1976 | Peck et al. | |
| 4,214,321 | A | 7/1980 | Nuwayser | |
| 4,515,841 | A | 5/1985 | Dyke | |
| 4,741,565 | A | 5/1988 | Bagg | |
| 4,752,093 | A | 6/1988 | Haber et al. | |
| 4,768,818 | A | 9/1988 | Kolic | |
| 4,788,733 | A | 12/1988 | Lerner | |
| 4,845,781 | A | 7/1989 | Strickland et al. | |
| 4,902,283 | A | 2/1990 | Rojko et al. | |
| 5,149,159 | A * | 9/1992 | Bardes | 294/1.3 |
| 5,565,503 | A * | 10/1996 | Garcia et al. | 523/124 |
| 6,096,831 | A | 8/2000 | Nagaoka et al. | |
| 6,203,080 | B1 * | 3/2001 | Surplus | 294/1.3 |
| 2011/0210571 | A1 * | 9/2011 | Dan | 294/1.3 |

OTHER PUBLICATIONS

Ruiz, F.A., "Mineral Reinforcement of Metallocene-Catalyzed LLDPE Film and Bags," TAPPI Polymers, Laminations, & Coatings Conference (2000) pp. 559-562.

* cited by examiner

*Primary Examiner* — Saul Rodriguez
*Assistant Examiner* — Gabriela Puig
(74) *Attorney, Agent, or Firm* — Frost Brown Todd LLC

(57) ABSTRACT

A decomposable collector and container for the manual collection and containment of small amounts of material without direct manual contact. The collector and container may decompose upon exposure to light, heat, ozone, or other environmental factor. The collector and container, comprises a first film formed into an elongated bag-like structure having an open end, a closed end, and closed side edges, the bag being sized to comfortably receive a user's hand, the closed end being gusseted to form a "W"-shape in cross section; the gussets in the closed end forming two interior pockets for receipt of the user's fingers and thumb, respectively, and an intermediate exterior pocket therebetween for receipt of the material being collected and for engagement thereof by and between the fingers and thumb, the collector and container when turned inside-out to remove it from the user's hand comprising a container for the collected material; wherein the first film comprises linear low density polyethylene, not more than about 25% aggregate, and a degradation additive.

13 Claims, 3 Drawing Sheets

DECOMPOSABLE COLLECTOR AND CONTAINER

CROSS REFERENCE TO RELATED APPLICATIONS

The present application hereby claims the benefit of the provisional patent application of the same title, Ser. No. 61/244,575, filed on Sep. 22, 2009, the disclosure of which is hereby incorporated by reference in its entirety.

BACKGROUND

The collector and container may be used to collect and contain a small object or a small amount of material without direct manual contact. For example, it could be used in law enforcement to collect and contain evidentiary material. It may be used in the collection and handling of sterilized equipment and materials, food items such as bakery goods and the like. The collector and container may provide a safe, practical, inexpensive means to pick up and contain undesirable waste material. For example, it may be used in the removal and containment of automotive oil filters, paint rollers and the like. It may be used to collect and contain small dead animals such as mice, birds, etc. An important application of the collector and container is the collection and containment of infectious and hazardous waste in medical, autopsy, and mortuary applications. The device may similarly be used for the collection and containment of organs, tissue, and the like to be tested.

A frequently encountered application for a device to pick up undesirable waste is in the collection and containment of pet feces. Many municipalities have ordinances requiring pet owners to be responsible for their pet's waste. Although clearly not intended to be so limited, the collector and container may be used for the collection and containment of pet waste.

Typically, mechanical devices forming an extension of the user's hand were used for this purpose. For example, U.S. Pat. No. 3,978,540 teaches a disposable pick-up container for animal litter utilizing two opposed cardboard scoops located at the open end of a bag. U.S. Pat. No. 4,752,093 teaches a ramp like element having a bag in association therewith. The animal waste is shifted onto the ramp by a disposable scoop or manually by inserting a hand in a pocket-like structure formed in the side of the bag. Thereafter, the bag is pulled over the ramp and sealed. U.S. Pat. No. 4,741,565 teaches a shovel-like structure having a handle for the operator's hand. The structure is provided with a bag which is pulled over the operator's hand during use. Once the shovel has been filled, the bag is pulled over the shovel, itself, and sealed. U.S. Pat. No. 3,739,418 teaches a flexible paper or plastic bag having a pair of opposed scoop panels secured adjacent its open end. Upon engaging the litter with the scoop panels, the bag is inverted to cause the litter to enter the bag. Thereafter, the panel scoop members are turned inwardly to seal the bag and form a carrying handle therefor.

The above-noted patents are exemplary of those relating to disposable waste collectors. The disposable waste collectors have certain common features. For example, they normally require two hands, or one hand and another object in order to operate. They lose flexibility and dexterity by using mechanical devices constituting extensions of the human hand. They incorporate supplemental devices for putting the waste into the container. They generally rely on the waste being of consistent size and texture and that the waste is to be picked up from a smooth surface. Finally, they employ a horizontal movement to pick up the waste.

As is well known, if an object is to be picked up by a mechanical device, opposing forces must be applied to that object. Opposing forces can be in the form of two pieces of cardboard working against one another; a scoop moving the waste object onto another object; or a shovel-like device pushing the waste object against a restraining object.

A disposable collector and container described in U.S. Pat. No. 5,149,159 (the disclosure of which is hereby incorporated by reference in its entirety) provided a better alternative to picking up objects than by mechanical devices. The disposable collector provides a hygienic, inexpensive, glove-like bag to protect the thumb and fingers of the user as they apply the opposing forces to pick up the object. The collecting operation is controlled by the sense of touch and unequalled dexterity of the human hand so that objects of varying size and consistency can be collected, even from entangling surfaces such as grass or the like. The material to be collected can be approached from any direction and at any angle including vertically, and is not restricted to a horizontal scooping action.

In addition, U.S. Pat. No. 5,149,159 outlines two ply construction which permits controlled movement between the films to resist abrasion and puncture. Compared to gloves, the two ply construction offers enhanced protection to the user and prevent cross-contamination.

Despite the many advantages of its two ply construction, there is always the need to improve the puncture and abrasion resistance of the film and improve the protection of the user. Concurrent with the need for a stronger, safer collector and container is the environmental need for the collector and container to decompose. The ability of the collector and container to decompose in an unknown set of environmental conditions will, in turn, permit its contents to decompose.

Typically printing on LDPE requires an electrolytic treatment, which prevents the welding of the film on the side that had been treated. Consequently, printing on a collector and container may only be only on the outside. There is a need for a collector and container than can have printing on both the inside and outside. This allows for example, the outside of a collector and container to have instructions for the collection and containment of a used oil filter. The inside of the collector and container can have printed recycling instructions. Prior to collecting and containing the used oil filter, the user can view the pertinent instructions on the outside. After collection and containment, which involves inversion of the collector and container, the user will be presented with recycling instructions on the outside.

BRIEF SUMMARY

The above-noted and other deficiencies may be overcome by providing a collector and container, comprising a first film formed into an elongated bag-like structure having an open end, a closed end, and closed side edges, the bag being sized to comfortably receive a user's hand, the closed end being gusseted to form a "W"-shape in cross section; the gussets in the closed end forming two interior pockets for receipt of the user's fingers and thumb, respectively, and an intermediate exterior pocket therebetween for receipt of the material being collected and for engagement thereof by and between the fingers and thumb, the collector and container when turned inside-out to remove it from the user's hand comprising a container for the collected material; wherein the first film comprises linear low density polyethylene, not more than about 25% aggregate, and at least one degradation additive.

In one embodiment the collector and container has better puncture resistance, stronger tensile strength, and stronger heat-welded seams.

In another embodiment, the collector and container exhibits a more consistent rate of decomposition.

In another embodiment, the collector and container exhibits reduced permeability of the odor of contents, including petroleum based products.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

Figure 2:
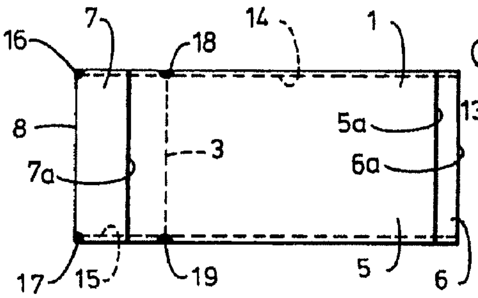
FIG. 2 is a plan view of an embodiment of the disposable collector and container of the present invention.

The glove-like collector and container may be made of a continuous strip of thin, flexible, moisture proof, vapor proof, and odor impervious material (also known as a film). The continuous strip, or the first film 1 is folded back upon itself, as is diagrammatically indicated in FIG. 1. It will be appreciated that in FIG. 1 and the other figures, the thickness of the first film 1 is exaggerated. At what will ultimately be the closed end of the collector and container, film 1 is folded along transverse fold lines 2, 3, and 4 forming a gusset having a "W"-shape. In the diagrammatic representation of FIG. 1, the sides 5 and 6 of the collector and container have not yet been joined together at their edges and are shown spaced from each other so that the "W"-shape of the closed end gusset can be more clearly represented. The end edges of the first film 1 are shown at 5*a* and 6*a*.

In one embodiment of the structure, the closed gusseted end is provided with a second film 7 of thin, flexible, moisture proof material. It will be noted that the second film 7 is folded along transverse fold lines 8, 9 and 10 to achieve the same "W"-shaped, gusseted configuration. The second film 7 is of the same width as the first film 1, but it extends only a short way along the collector and container sides 5 and 6. The end edges of second film 7 are shown at 7*a* and 7*b*.

Figure 1:
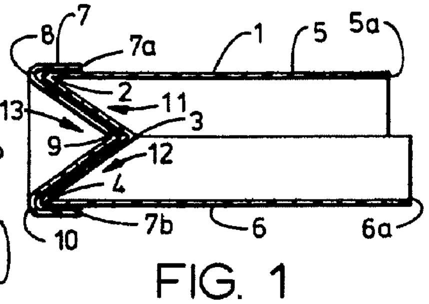
FIG. 1 is a simplified, diagramatic, edge elevational view of an embodiment of the disposable collector and container comprising a first and second film, the films being partially folded prior to welding.

As is evident from the diagrammatic representation of FIG. 1, the closed, gusseted end of the collector and container forms three pockets. Two interior pockets are generally indicated at 11 and 12, while an intermediate exterior pocket is generally indicated at 13. The purpose of these pockets will be apparent hereinafter.

FIG. 2 illustrates one embodiment of films 1 and 7 in plan view laid up together and flattened upon each other. In FIG. 2, the end edge 7*a* of second film 7 is shown, together with the fold line 8 of second film 7. Those portions 5 and 6 of first film 1 forming the sides of the collector and container are also shown, together with their end edges 5*a* and 6*a*. While the end edges 5*a* and 6*a* may overlie each other, in the embodiment illustrated in FIGS. 1 and 2, side portion 6 is shown slightly longer than side portion 5 for ease of handling and ease of opening the open end of the bag-like collector and container. Finally, in FIG. 2, the fold line 3 of first film 1 is shown in broken lines.

Once the films 1 and 7 have been laid up as shown in FIG. 2, their longitudinal edges can be joined together by any appropriate means. When films 1 and 7 are made of plastic material, a method of joining the longitudinal sides together is by heat welding or the like, as is indicated by broken lines 14 and 15. In one embodiment reinforcing welds 16 and 17 may be applied at the forward most corners of the structure together with reinforcing welds 18 and 19 located on the longitudinal edges of the structure at the juncture of fold 3 of first film 1 and fold line 9 of second film 7.

Figure 3:
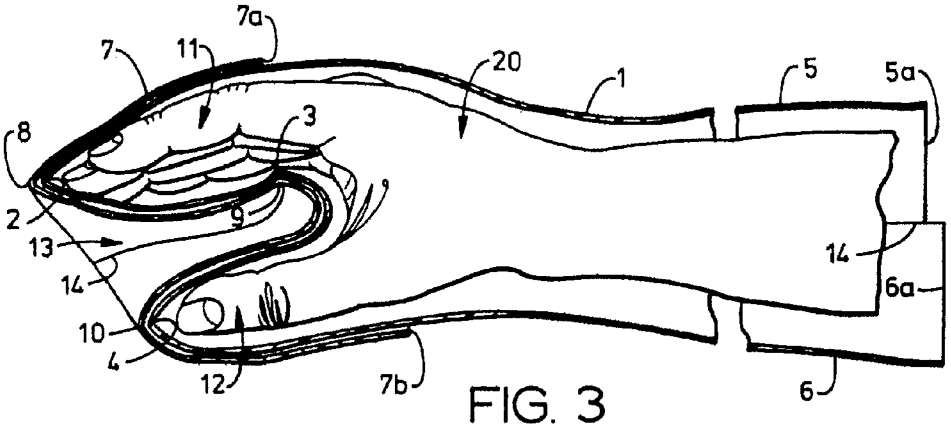
FIG. 3 is a fragmentary, longitudinal, cross-sectional view of an embodiment of the disposable collector and container with the user's hand positioned therein.
Figure 5:
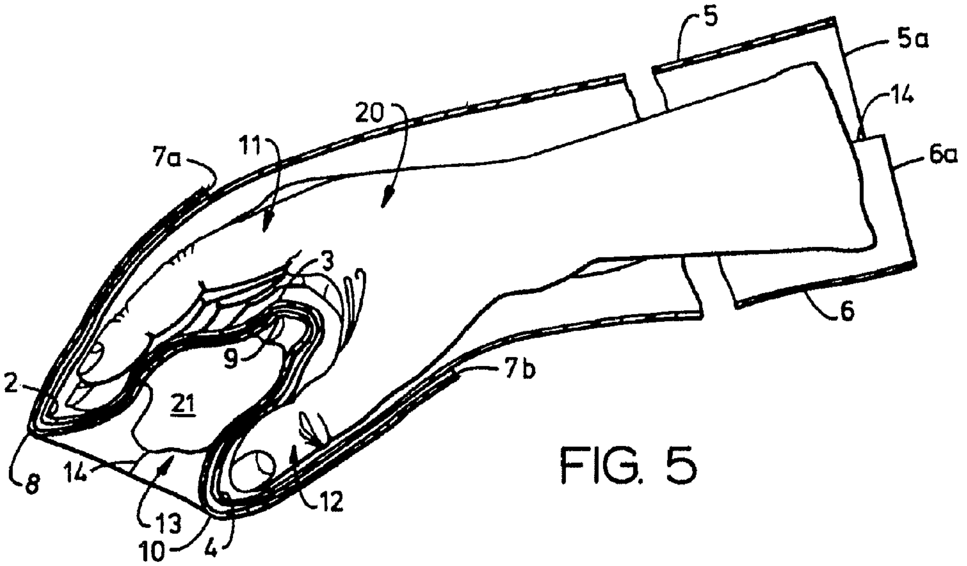
FIG. 5 is a fragmentary cross-sectional view similar to FIG. 3 illustrating material being picked up by an embodiment of the collector and container.
Figure 8:
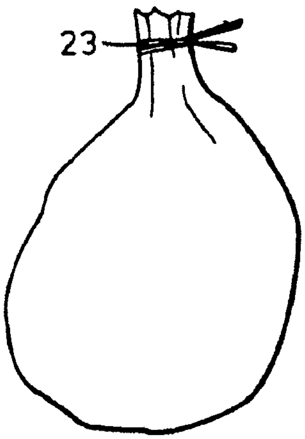
FIG. 8 illustrates an embodiment of the disposable collector and container with its open end closed by a tie device.
Figure 4:
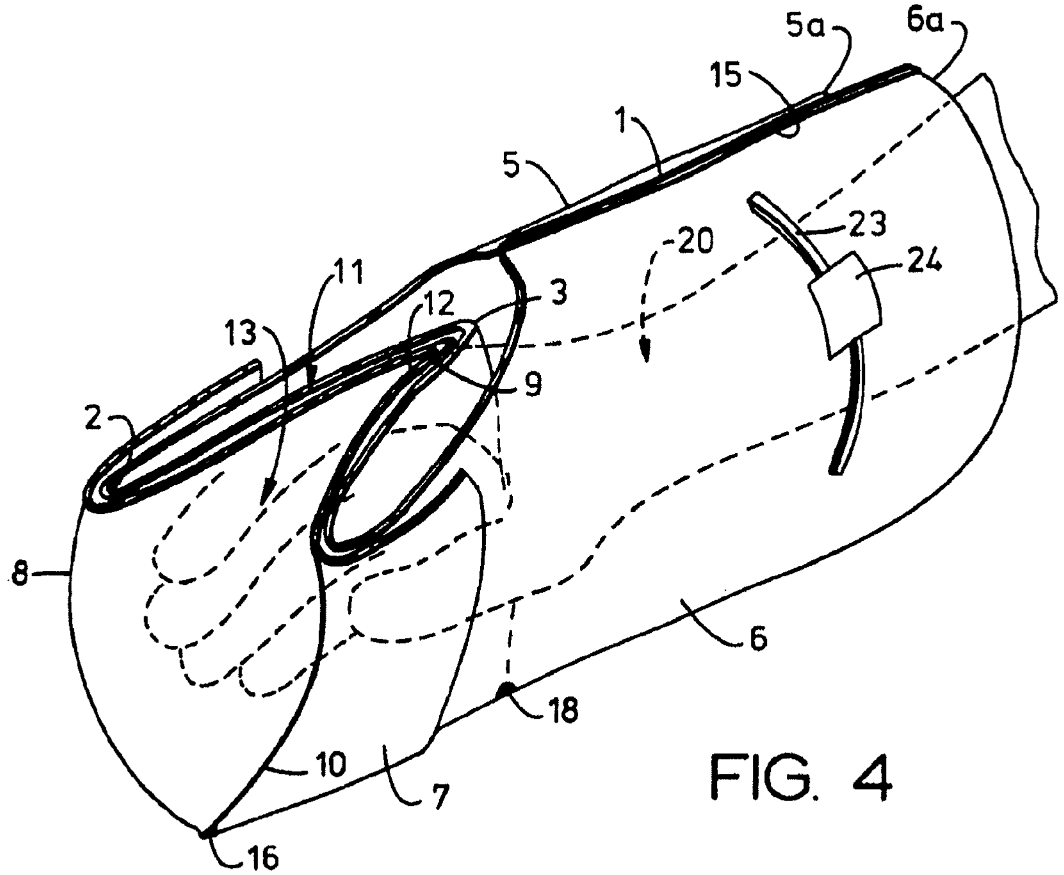
FIG. 4 is a fragmentary perspective view of an embodiment of the disposable collector and container with the user's hand located therein and with a forward corner of the collector and container broken away.

In FIGS. 3 and 4, one embodiment of the collector and container is illustrated with the user's hand (generally indicated at 20) located therein. Again, like parts have been given like index numerals. It will be evident from these figures that one of interior pockets 11 and 12 is intended to receive the fingers of the operator, while the other of interior pockets 11 and 12 is intended to receive the operator's thumb. The intermediate exterior pocket 13 is located between the operator's fingers and thumb so that an opposed, grasping force can be applied to both sides of exterior pocket 13 to engage the material to be collected therein. This is illustrated in FIG. 5, wherein like parts have again been given like index numerals. To collect the material 21 of interest, the user simply shifts his thumb away from his fingers. This opens the exterior pocket 13. Thereafter, the user approaches the material 21 to be collected from any convenient angle and direction, locating the exterior pocket 13 thereabout. By closing his fingers and thumb toward each other, the operator applies a grasping force to the sides of exterior pocket 13 and against the material 21 being collected so that the material 21 can be grasped and removed from the surface upon which it was located. If necessary, the user can direct his hand 20 upwardly to assure that the material 21 is fully seated within exterior pocket 13. This operation can be repeated as necessary. At this stage, the collecting step of the operation is completed.

As indicated above, in one embodiment the closed end of the collector and container is provided with second film 7. In one embodiment, the second film 7 may be embossed. This not only increases the structural strength of the outside pocket 13, it also minimizes the thermal and texture distastefulness associated with picking up undesirable waste.

Second film 7 may be joined with first film 1 only along the longitudinal edges of the bag-like collector and container, at weld lines 14 and 15. There is no joinder of the two films along the end edges 7*a* and 7*b* of second film 7. Therefore, a thin layer of air exists between first play 1 and second film 7. The embossing of strip 7 further assures the existence of this thin air layer between the films. If a surface abrasion is encountered during collection of the material of interest, lateral movement between the films will result, rather than a rupturing of either of the films. The existence of the air layer further reduces friction between the films. The air layer further reduces the thermal and texture distastefulness mentioned above. The embossing of the strip 7 provides a textured surface enhancing the gripping of the material to be collected.

Figure 7:
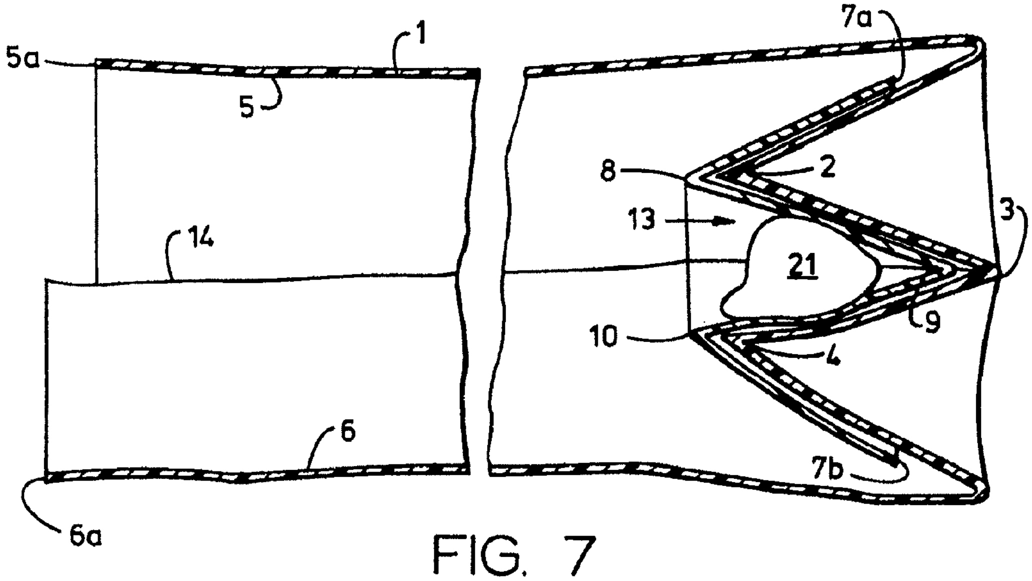
FIG. 7 is a fragmentary cross-sectional view illustrating an embodiment of the collector and container fully turned inside-out with the collected material contained therein.

When the material has been picked up, as shown in FIG. 5, it can be transferred to another container. Alternatively the collector and container, itself, can be used to encapsulate the material 21. To this end, the user's free hand 22 is used to engage the bag-like collector and container at its rearward or open end. Once so engaged, the operator's free hand is used to pull the open or rearward end of the collector and container forwardly of the occupied hand 20, turning the bag-like collector and container inside out. This not only removes the structure from the operator's hand 20, but also fully contains the collected material 21 as shown in FIG. 7.

Figure 6:
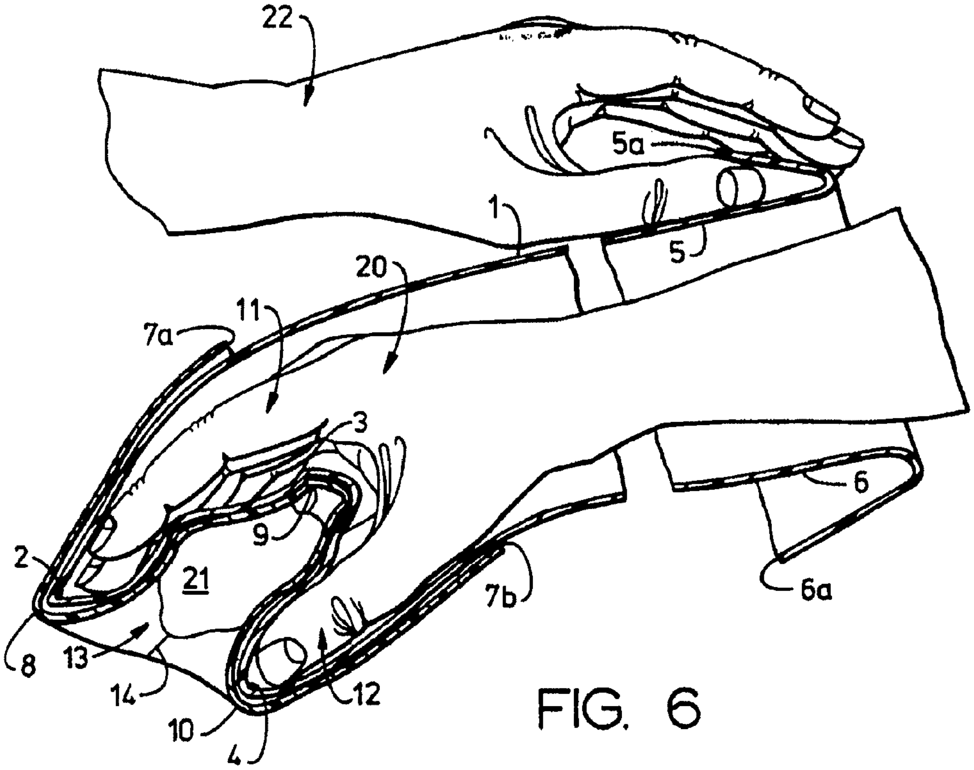
FIG. 6 is a fragmentary cross-sectional view, similar to FIG. 5, and showing an embodiment of the collector and container being turned inside-out.

At this stage, the only remaining step to complete the collecting and containing procedure is the closing of the open end of the bag-like collector and container. The manner in which the open end of the bag-like collector and container is closed does not constitute a limitation of the present invention. For example, the collector and container may come with a plastic or wire reinforced tie 23 affixed thereto by a small piece of tape 24 (see FIG. 4). The tie 23 may be used to close the open end of the collector and container, as shown in FIG. 6. Other means may be used to close the collector and container. For example, the elongated body of the collector and container may simply be tied in an overhand knot. The structure may be provided with a drawstring or the sides 5 and 6 may have areas covered with adhesive which come into contact only after the structure has been turned inside out.

The material from which films 1 and 7 are made can vary, depending upon the application to which the collector and container is directed. Films 1 and 7 may be made of thin, flexible, moisture proof plastic material. While not necessarily so limited, the films 1 and 7 can be made of the various forms of polyethylene (PE), which are well known in the art and are readily available. In one embodiment, the first film 1 has a thickness falling in the range of from about 0.07 mils to about 1.25 mils. In another embodiment, the first film 1 has a thickness of from about 0.8 mils to about 1.1 mils, 0.9 mils to about 1.1 mils, or about 1 mil. In another embodiment, second film 7 has a thickness of from about 0.8 mils to about 1.1 mils, 0.9 mils to about 1.1 mils, or about 1 mil.

In one embodiment, the films may be made from linear low density polyethylene (LDPE). The LDPE may be biodegradable, or degrade upon exposure to UV light, heat, ozone, or other environmental factor. Degradation additives may be added to the LDPE to allow it to degrade. Examples of degradation additives are SCM, PDQ, PDQ-H, BDA, or UV-H (sold by Willow Ridge Plastics and others). Degradation additives may be used in various amounts. In one embodiment, the degradation additive may be about 5% or less of the film. The degradation additive may be from about 1% to about 3%, about 3%, about 2%, or about 1%. In one embodiment the film comprises more than one degradation additive.

A degradable plastic allows the collector and container to be disposed without producing environmental damage. The collector and container may degrade allowing the contents to come into contact with the environment and also degrade. The time it takes for a collector and container to decompose depends upon the conditions it is exposed to. Generally, at conditions with higher temperature, moisture, and oxygen, the collector and container will decompose over a shorter period of time. A plastic is considered to degrade when it has an elongation of 5% or less before it fails. Typically a freshly extruded LDPE will have an elongation of about 600% before failure.

Aggregates may be added to the films to improve the strength, puncture resistance, tear resistance, seal strength, printability, decrease odor permeability, and provide a better petrochemical barrier. An example of an aggregate is $CaCO_3$. Typically printing on LDPE requires an electrolytic treatment, which prevents the welding of the film on the side that had been treated. Use of an aggregate in the LDPE allows printing on both sides of the films because they no longer require an electrolytic treatment and may be welded. An aggregate is typically used with a carrier resin, such as LDPE. When the amount of aggregate is expressed as a percentage, it will be a weight percentage of the aggregate in a compatible carrier resin.

In one embodiment the film may comprise about 25% or less aggregate. The film may comprise from about 20% to about 25% aggregate, about 15% to about 20% aggregate, about 10% to about 15% aggregate, or about 5% to about 10% aggregate. The aggregate may be about 10%, about 11%, about 12, or about 13%.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

Percentages are weight percents.

EXAMPLES

Example 1

Linear low density polyethylene (LDPE) (81%), PDQ (1%, from Willow Ridge Plastics), $CaCO_3$ (10%, as 7:1 of $CaCO_3$:LDPE, total $CaCO_3$ was 8.75%), and pigments (8%) were mixed together. The plastic was extruded under extreme pressure, blown through air to form a tube, the tube was collapsed then slit to form a film of about 1 mil. The film was formed into the collector and container shown in the figures and the seams were welded, at a temperature of about 300° F. to 320° F.

The collector and container has a 1-2 year shelf life at room temperature. The time it takes for a collector and container to degrade depends upon a variety of environmental conditions. The collector and container will degrade over a period of about 10 days in an oven at 150° F. The collector and container will degrade over a period of about 7-10 weeks in an active compost with high temperature, moisture, and oxygen content. The collector and container will degrade over a period of about 18-24 months in a landfill.

Unused plastic from the manufacturing process can be recycled to make more film for collectors and containers by blending it with new raw materials.

Without prior electrolytic treatment, the collector and container could be printed on by using standard inline printing techniques.

Comparison Example 2

Linear low density polyethylene (LDPE) (80%), cornstarch (12%, in LDPE vehicle, from Willow Ridge Plastics), and pigments (8%) were mixed together. The plastic was extruded under extreme pressure, blowing through air to form a tube, the tube was collapsed then slit to form a film with a thickness of about 1.25 mil. A second film was formed with a thickness of about 1.25 mil. The two films were formed into the collector and container and the seams were welded at a temperature of about 370° F. The weld seams were not as strong as those in Example 1 and has an accelerated non-uniform rate of degradation The collector and container had a similar degradation profile as Example 1, except that it did not degrade completely in a landfill. Unused plastic from the manufacturing process could not be melted and recycled to make more film for collectors and containers.

The collector and container required electrolytic treatment prior to any printing by using standard inline printing techniques. Consequently only one side could be printed because electrolytic treatment would interfere with side welding.

Comparison Example 3

The collector and container of Example 1 was made except the amount of $CaCO_3$ used was increased to 30% (as 7:1 of $CaCO_3$:LDPE, total $CaCO_3$ was 26%), the LDPE was decreased to 61%. The collector and container had unpredictable degradation and would degrade between 3 weeks to 10 weeks in a test oven at 150° F.

What is claimed is:

1. A collector and container, comprising a first film formed into an elongated bag-like structure having an open end, a closed end, and closed side edges, the bag being sized to comfortably receive a user's hand, the closed end being gusseted to form a "W"-shape in cross section;

the gussets in the closed end forming two interior pockets for receipt of the user's fingers and thumb, respectively, and an intermediate exterior pocket therebetween for receipt of the material being collected and for engagement thereof by and between the fingers and thumb, the collector and container when turned inside-out to remove it from the user's hand comprising a container for the collected material;

wherein the first film comprises linear low density polyethylene, about 5% to about 15% aggregate, and at least one degradation additive;

wherein the collector and container additionally comprising a second film overlying the closed end of the collector and container, the second film being gusseted to have a corresponding "W"-shape in cross section, the second film comprising the exterior film when said collector and container is right side-out, the second film being attached to the collector and container in such a way that a thin layer of air exists therebetween, reducing friction between the collector and container and the second film and enhancing movement therebetween.

2. The collector and container of claim 1, additional comprising a means to close the open end when the collector and container is turned inside-out.

3. The collector and container of claim 1, wherein the thickness of the first film is about 1 mil.

4. The collector and container of claim 1, wherein the thickness of the first and second films are about 1 mil.

5. The collector and container of claim 1, wherein collector and container has printing on both the inside and outside of the bag on the first film.

6. The collector and container of claim 1, wherein the second film comprises linear low density polyethylene, an aggregate, and at least one degradation additive.

7. The collector and container of claim 1, wherein the first film comprises about 9% aggregate.

8. The collector and container of claim 1, wherein the first film comprises about 11% aggregate.

9. The collector and container of claim 1, wherein the aggregate is calcium carbonate.

10. The collector and container of claim 9, wherein the calcium carbonate has been surface treated with stearic acid.

11. The collector and container of claim 1, wherein the first film comprises a pigment.

12. The collector and container of claim 1, wherein the collector and container has the property of decomposing after exposure to 150° F. continuously over a period of about 10 days.

13. A collector and container, comprising a first film formed into an elongated bag-like structure having an open end, a closed end, and closed side edges, the bag-like structure being sized to comfortably receive a user's hand, the closed end being gusseted to form a "W"-shape in cross section;

the gussets in the closed end forming two interior pockets for receipt of the user's fingers and thumb, respectively, and an intermediate exterior pocket therebetween for receipt of the material being collected and for engagement thereof by and between the fingers and thumb, the collector and container when turned inside-out to remove it from the user's hand comprising a container for the collected material;

wherein the first film comprises linear low density polyethylene, about 5% to about 15% aggregate, and at least one degradation additive;

wherein the bag-like structure has an inside and outside, wherein collector and container has printing on both the inside and outside of the bag-like structure on the first film.

* * * * *